United States Patent
Ignatescu et al.

(10) Patent No.: US 12,050,272 B2
(45) Date of Patent: Jul. 30, 2024

(54) LIGHT DETECTION AND RANGING (LIDAR) SYSTEM

(71) Applicant: UATC, LLC, Pittsburgh, PA (US)

(72) Inventors: Florin Cornel Ignatescu, San Jose, CA (US); Daniel Fredric Gruver, San Francisco, CA (US); Gaetan Pennecot, San Francisco, CA (US)

(73) Assignee: UATC, LLC, Pittsburgh, PA (US)

( * ) Notice: Subject to any disclaimer, the term of this patent is extended or adjusted under 35 U.S.C. 154(b) by 859 days.

(21) Appl. No.: 16/921,320

(22) Filed: Jul. 6, 2020

(65) Prior Publication Data

US 2021/0341621 A1 Nov. 4, 2021

Related U.S. Application Data

(60) Provisional application No. 63/018,036, filed on Apr. 30, 2020.

(51) Int. Cl.
*G01S 17/931* (2020.01)
*G01S 7/4911* (2020.01)
(Continued)

(52) U.S. Cl.
CPC .......... *G01S 17/931* (2020.01); *G01S 7/4911* (2013.01); *G01S 7/4913* (2013.01); *G01S 17/02* (2013.01); *G01S 7/4918* (2013.01)

(58) Field of Classification Search
None
See application file for complete search history.

(56) References Cited

U.S. PATENT DOCUMENTS

| 5,760,885 A | * | 6/1998 | Yokoyama | G01S 7/484 356/4.01 |
| 6,246,468 B1 | * | 6/2001 | Dimsdale | G01B 11/24 356/4.02 |

(Continued)

FOREIGN PATENT DOCUMENTS

| DE | 102015115101 A1 | 3/2017 |
| DE | 102017105210 | 9/2018 |

(Continued)

OTHER PUBLICATIONS

JP H05215839 A (Year: 1983).*

(Continued)

*Primary Examiner* — Yuqing Xiao
*Assistant Examiner* — Jempson Noel
(74) *Attorney, Agent, or Firm* — Dority & Manning, P.A.

(57) ABSTRACT

A LIDAR system is provided. The LIDAR system includes an emitter. The emitter includes a light source and one or more lenses positioned along a transmit path. The light source is configured to emit a primary laser beam through the one or more lenses in the transmit path to provide a transmit beam. The LIDAR system includes a receiver spaced apart from the emitter. The receiver includes one or more lenses positioned along a receive path such that the one or more lenses receive a reflected laser beam. The LIDAR system includes an optical element positioned along the transmit path. The optical element is configured to direct a portion of the primary laser beam in a direction towards the receive path as a secondary laser beam.

20 Claims, 10 Drawing Sheets

(51) Int. Cl.
*G01S 7/4912* (2020.01)
*G01S 7/4913* (2020.01)
*G01S 17/02* (2020.01)

(56) References Cited

U.S. PATENT DOCUMENTS

| | | | | |
|---|---|---|---|---|
| 8,743,358 | B2* | 6/2014 | Treado | G01N 21/65 |
| | | | | 356/326 |
| 10,802,120 | B1* | 10/2020 | LaChapelle | G01S 17/10 |
| 2001/0009458 | A1* | 7/2001 | Asaka | G01S 17/10 |
| | | | | 356/28.5 |
| 2010/0277714 | A1* | 11/2010 | Pedersen | G01S 7/497 |
| | | | | 356/28 |
| 2014/0222287 | A1* | 8/2014 | Popham | B60G 17/0165 |
| | | | | 701/37 |
| 2015/0146189 | A1* | 5/2015 | Kim | G01S 17/931 |
| | | | | 356/4.01 |
| 2016/0146941 | A1* | 5/2016 | Hassenpflug | G01S 17/931 |
| | | | | 342/54 |
| 2017/0123053 | A1* | 5/2017 | Stigwall | G01S 17/48 |
| 2018/0045816 | A1 | 2/2018 | Jarosinski et al. | |
| 2018/0107221 | A1* | 4/2018 | Droz | G01S 7/4818 |
| 2018/0284237 | A1* | 10/2018 | Campbell | G01S 17/931 |
| 2019/0317199 | A1* | 10/2019 | Chong | G01S 17/32 |
| 2020/0072948 | A1* | 3/2020 | Nguyen | G01S 17/10 |
| 2020/0158829 | A1* | 5/2020 | Han | G01S 7/484 |
| 2021/0055390 | A1* | 2/2021 | LaChapelle | G01S 7/4814 |

FOREIGN PATENT DOCUMENTS

| | | |
|---|---|---|
| EP | 3165874 | 5/2017 |
| GB | 2272123 | 5/1994 |
| JP | S 61003486 U | 1/1986 |
| JP | H 05014968 U | 2/1993 |
| JP | H 05215839 A | 8/1993 |
| JP | H 06118161 A | 4/1994 |
| JP | H 07306260 A | 11/1995 |
| JP | H 08220230 A | 8/1996 |

OTHER PUBLICATIONS

International Preliminary Report and Written Opinion for Application No. PCT/US2021/029083, mailed Aug. 13, 2021, 13 pages.

* cited by examiner

LIGHT DETECTION AND RANGING (LIDAR) SYSTEM

RELATED APPLICATION

The present application is based on and claims benefit of U.S. Provisional Patent Application No. 63/018,036 having a filing date of Apr. 30, 2020, which is incorporated by reference herein.

FIELD

The present disclosure relates generally to LIDAR systems.

BACKGROUND

LIDAR systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment. The LIDAR system also includes circuitry to measure the time-of-flight (that is, the elapsed time from emitting the laser beam to detecting the reflected laser beam). The time-of-flight measurement is used to determine the distance of the LIDAR system to the object.

SUMMARY

Aspects and advantages of embodiments of the present disclosure will be set forth in part in the following description, or may be learned from the description, or may be learned through practice of the embodiments.

One example aspect of the present disclosure is directed to a LIDAR system. The LIDAR system includes an emitter. The emitter includes a light source and one or more lenses positioned along a transmit path. The light source is configured to emit a primary laser beam through the one or more lenses in the transmit path to provide a transmit beam. The LIDAR system includes a receiver spaced apart from the emitter. The receiver includes one or more lenses positioned along a receive path such that the one or more lenses receive a reflected laser beam. The LIDAR system includes an optical element positioned along the transmit path. The optical element is configured to direct a portion of the primary laser beam in a direction towards the receive path as a secondary laser beam.

Another example aspect of the present disclosure is directed to an autonomous vehicle. The autonomous vehicle includes a LIDAR system. The LIDAR system includes an emitter. The emitter includes a light source and one or more lenses positioned along a transmit path. The light source is configured to emit a primary laser beam through the one or more lenses in the transmit path to provide a transmit beam. The LIDAR system includes a receiver spaced apart from the emitter. The receiver includes one or more lenses positioned along a receive path such that the one or more lenses receive a reflected laser beam. The LIDAR system includes an optical element positioned along the transmit path. The optical element is configured to direct a portion of the primary laser beam in a direction towards the receive path as a secondary laser beam.

Yet another example aspect of the present disclosure is directed to a method of operating a LIDAR system that includes an emitter and a receiver spaced apart from the emitter. The method includes emitting, via the emitter, a primary laser beam through one or more lenses disposed along a transmit path to provide a transmit beam. The method further includes directing, via an optical element disposed along the transmit path, a portion of the primary laser beam as a secondary laser beam towards a receive path associated with the receiver of the LIDAR system. Still further, the method includes directing, via an optical element disposed along the transmit path, a portion of the primary laser beam as a secondary laser beam towards a receive path associated with the receiver of the LIDAR system.

Other example aspects of the present disclosure are directed to other systems, methods, vehicles, apparatuses, tangible non-transitory computer-readable media, and devices for motion prediction and/or operation of a device including a vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
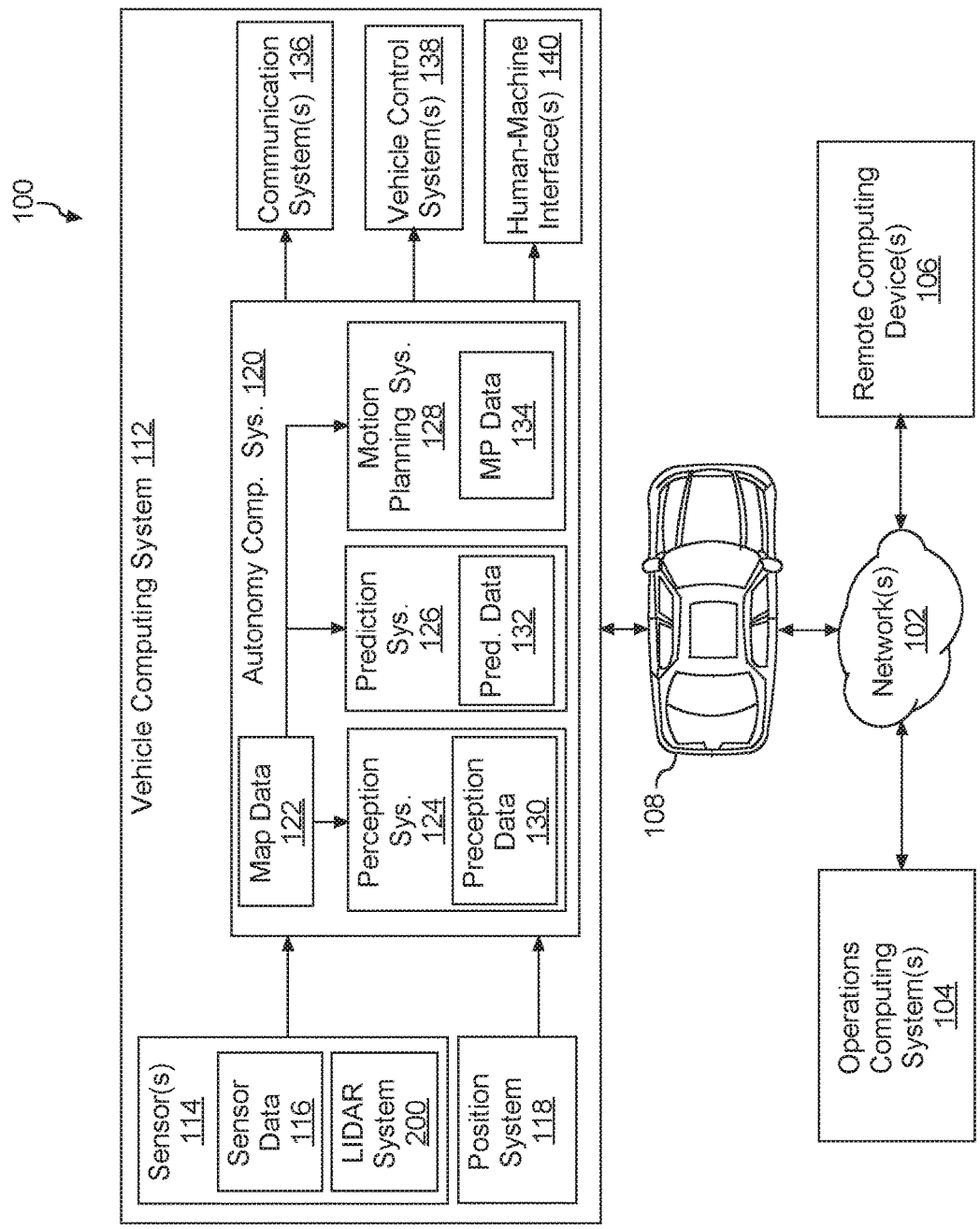
FIG. 1 depicts a block diagram of an example system for controlling the computational functions of an autonomous vehicle according to example embodiments of the present disclosure.

Example aspects of the present disclosure are directed to a light detection and ranging (LIDAR) system. The LIDAR system can be used, for instance, in conjunction with an autonomous vehicle. The LIDAR system can include an emitter and a receiver that is spaced apart from the emitter. The emitter can emit a transmit beam that can reflect off of one or more objects. The receiver can receive one or more reflected beams and process the one or more reflected beams to generate a depth map of a surrounding environment in which the autonomous vehicle is operating. However, since the receiver is spaced apart from the emitter, an amount of light received by the receiver decreases when the one or more objects are within a close range (e.g., within about 10 meters) of the autonomous vehicle. This decrease in the amount of light when the one or more objects are within the close range of the autonomous vehicle introduces a parallax error. The parallax error is due, at least in part, to the reflected laser beams moving relative to the receiver such that the one or more objects are not detected by the LIDAR system. In this manner, the LIDAR system can have a blind spot that is due, at least in part, to the offset (e.g., spacing) between the emitter and the receiver.

The technology of the present disclosure can improve the LIDAR system to solve this parallax error and reduce such a resulting blind spot. For instance, the emitter of the LIDAR system can include a light source (e.g., laser diode) and one or more lenses or other optical elements positioned along a transmit path. The light source can emit a primary laser beam through the one or more lenses or other optical elements to provide a transmit beam along the transmit path. The transmit beam can have a narrow divergence angle so that it can travel long distances and can be reflected off of surfaces.

Furthermore, the receiver of the LIDAR system can include a detector and one or more lenses or other optical elements positioned along a receive path. In this manner, the one or more lenses or other optical elements can focus a reflected laser beam onto the detector. The detector can generate data points and/or a point cloud based on the detected laser beams to generate a depth map of a surrounding environment.

According to example aspects of the present disclosure, the LIDAR system can include an optical element positioned along the transmit path. The optical element can direct a portion of the primary laser beam in a direction towards the receive path as a secondary laser beam. The secondary laser beam can have a wide divergence angle relative to the transmit beam. Furthermore, the secondary laser beam can spread within a near-field associated with the LIDAR system. As such, the secondary laser beam can reflect off of objects within the near-field and can be directed onto the detector via the one or more lenses or other optical elements in the receive path. Furthermore, since the secondary laser beam spreads within the near-field, light reflected off the objects with the near-field and directed onto the detector can be increased. This can lead to increased capability of the LIDAR system to detect objects within the near-field that may otherwise not be detected due to the parallax error.

In some implementations, the LIDAR system can be implemented onboard an autonomous vehicle (e.g., ground-based vehicle, aerial vehicle, etc.). The autonomous vehicle can include various systems and devices configured to control the operation of the autonomous vehicle. For example, the autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. This can include, for example, detecting of object(s) (e.g., pedestrians, vehicles, bicycles/bicyclists, etc.) within the vehicle's surrounding environment, predicting the future motion trajectory of those objects, and planning the vehicle's motion to avoid interference with the object(s). Moreover, the autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicle can be configured to operate in one or more modes including, for example, a fully autonomous operating mode, a semi-autonomous operating mode, and a manual operating mode. The fully autonomous (e.g., self-driving) operating mode can be one in which the autonomous vehicle can provide driving and navigational operation with minimal and/or no interaction from a human driver present in the autonomous vehicle. The semi-autonomous operating mode can be one in which the vehicle can operate with some interaction from a human driver present in the vehicle. The manual operating mode can be one in which a human driver present in the autonomous vehicle manually controls (e.g., acceleration, braking, steering) the autonomous vehicle via one or more input devices (e.g., steering device) of the autonomous vehicle.

The LIDAR system can be implemented on the autonomous vehicle to obtain data associated with the surrounding environment in which the autonomous vehicle is operating (e.g., while online with service entity, performing a vehicle service, etc.). In particular, the emitter of the LIDAR system and the receiver of the LIDAR system can be spaced apart from one another along a lateral direction of the autonomous vehicle or a vertical direction of the autonomous vehicle. It should be understood that the lateral direction can extend between opposing sides (e.g., first side and second side) of the autonomous vehicle. It should also be understood that the vertical direction can extend between a bottom portion of the autonomous vehicle and a top portion of the autonomous vehicle. Operation of the LIDAR system will now be discussed in more detail.

The emitter can include a light source (e.g., laser diode) and one or more lenses positioned along a transmit path. The light source can be configured to emit a primary laser beam through the one or more lenses to provide a transmit beam. In some implementations, a divergence angle associated with the transmit beam can be about 0.5 degrees or less. It should be understood that the divergence angle is indicative of an increase in beam diameter or radius of the transmit beam with distance from the one or more lenses. Stated another way, the divergence angle of the transmit beam can be the angle subtended by the transmit beam exiting the last lens in the transmit path.

It should be understood that the LIDAR system can include any suitable number of emitters. For instance, in some implementations, the LIDAR system can be configured as a single channel system having only one emitter. In alternative implementations, the LIDAR system can be configured as a multi-channel system that includes an array of emitters. Furthermore, each emitter included in the array of light sources can correspond to a single channel in the multi-channel system.

In some implementations, the one or more lenses of the emitter can include a first lens and a second lens. It should be understood, however, that the emitter can include more or fewer lenses. The first lens and the second lens can, in some implementations, be positioned along the transmit path such that the first lens is positioned between the light source and the second lens along the transmit path. In this manner, the primary laser beam emitted from the light source can pass through the first lens before passing through the second lens.

In some implementations, the first lens and the second lens can each be a collimation lens. For instance, the first lens and the second lens can be a fast-axis collimation lens and a slow-axis collimation lens, respectively. The fast-axis collimation lens can be configured to reduce a divergence angle associated with the primary laser beam. In particular, the fast-axis lens can be configured to reduce the divergence angle such that the primary laser beam is directed towards the slow-axis collimation lens. It should also be understood that the beam output by the slow-axis collimation lens can be the transmit beam.

The receiver can include a detector and one or more lenses positioned along a receive path. In this manner, the one or more lenses of the receiver can receive a reflected laser beam. Furthermore, the one or more lenses of the receiver can be configured to direct the reflected laser beam onto the detector. The detector can be configured to process the reflected laser beam to generate a point cloud indicative of the surrounding environment in which the autonomous vehicle is operating. In particular, the point cloud can be indicative of a distance to one or more objects along a path to be traversed by the autonomous vehicle.

According to example aspects of the present disclosure, the LIDAR system can include an optical element disposed along the transmit path. The optical element can be configured to divert a portion of the primary laser beam towards the receive path as a secondary laser beam. An amount of energy associated with the secondary laser beam can be less than an amount of energy associated with the primary laser beam. For instance, in some implementations, the amount of energy associated with the secondary laser beam can be less than about 5 percent of a total energy associated with the primary laser beam. Additionally, or alternatively, a divergence angle associated with the secondary laser beam can be different than the divergence angle associated with the transmit beam. For instance, in some implementations, the divergence angle of the secondary laser beam can range from about 2 degrees to about 30 degrees. In this manner, the secondary laser beam can spread out with distance and therefore be less focused than the transmit beam. It should be understood that the divergence angle of the secondary laser beam can be the angle subtended by the secondary laser beam exiting the optical element.

In some implementations, the optical element can form at least a portion of the one or more lenses in the transmit path. For instance, in some implementations, the one or more lenses in the transmit path can include a bifocal lens. In such implementations, the bifocal lens can be configured to direct a majority of the primary laser beam along the transmit path as the transmit beam. The bifocal lens can be further configured to direct a minority of the primary laser beam towards the receive path as the secondary laser beam.

In some implementations, the one or more lenses in the transmit path can include a fast-axis collimation lens. In such implementations, the optical element can include a portion of the fast-axis collimation lens. For instance, a portion of the fast-axis collimation lens can be configured to direct a portion of the primary laser beam towards the receive path as the secondary laser beam. Furthermore, the fast-axis collimation lens can be configured to spread the secondary laser beam to reduce or eliminate a parallax error associated with detecting objects in the near-field associated with the LIDAR system.

In some implementations, the optical element can form at least a portion of the one or more lenses in the transmit path. For instance, the one or more lenses in the transmit path can include a slow-axis collimation lens. In such implementations, the portion of the lens can form at least a portion of the slow-axis collimation lens. In this manner, the portion of the lens can divert a portion of the primary laser beam towards the receive path as the secondary laser beam.

In some implementations, the optical element can include a diffuser. The diffuser can spread the primary laser beam such that a portion of the primary laser beam is directed towards the receive path as the secondary laser beam. In some implementations, the diffuser can form at least a portion of the one or more lenses in the transmit path. For instance, the diffuser can correspond to a portion of a surface of the one or more lenses that is modified relative to the remainder of the surface. As an example, the portion of the surface can be roughened relative to the remainder of the surface. In some implementations, the diffuser can include a coating that is applied to at least a portion of the surface of the one or more lenses in the transmit path. The portion of the surface to which the coating is applied can direct the primary light towards the receive path as the secondary laser beam.

In some implementations, the portion of the surface of the one or more lenses that is modified relative to the remainder of the surface can correspond to any suitable surface of the one or more lenses in the transmit path. For instance, in some implementations, the surface can be associated with an edge of the one or more lenses in the transmit path. It should also be appreciated that, in some implementations, the diffuser can be separate (e.g., standalone) from the one or more lenses in the transmit path.

In some implementations, the optical element can include a divergence lens (e.g., a wedge prism) positioned in the transmit path between the first lens and the second lens. In such implementations, the divergence lens can be configured to divert a portion of the primary laser beam exiting the first lens towards the receive path as a secondary laser beam. It should be appreciated, however, that the divergence lens can be positioned at any suitable location along the transmit path.

Another example aspect of the present disclosure is directed to a method of controlling operation of the LIDAR system. The method can include emitting, via the emitter, the primary laser beam through the one or more lenses disposed along the transmit path to provide the transmit beam. The method can further include directing, via the optical element disposed along the transmit path, a portion of the primary laser beam towards the receive path as the secondary laser beam. In addition, the method can include receiving, via one or more lenses of the receiver, a reflected laser beam. Furthermore, the method can include generating, via the detector of the receiver, a point cloud based, at least in part, on data associated with the reflected laser beam.

An autonomous vehicle can utilize the described LIDAR system to account for object(s) within a near-field associated with the LIDAR system during autonomous operation. For instance, an autonomous vehicle (e.g., its onboard computing system) can obtain sensor data via the LIDAR system. The sensor data can be indicative of an object within a near-field associated with the LIDAR system. The autonomous vehicle can determine perception data for the object within the near-field associated with the LIDAR system based at least in part on the sensor data. The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information. The autonomous vehicle can determine future location(s) of the object based at least in part on the perception data. For example, the autonomous vehicle can generate a trajectory (e.g., including one or more waypoints) that is indicative of a predicted future motion of the object, given the object's heading, velocity, type, etc. over current/previous timestep(s). The autonomous vehicle can determine an action for the autonomous vehicle based at least in part on the detected object and/or the future location(s) of the object within the near-field associated with the LIDAR system. For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

A LIDAR system in accordance with the present disclosure can provide numerous technical effects and benefits. For instance, the optical element disposed in the transmit path can, as discussed above, divert a portion of the primary laser beam emitted by the light source of the emitter towards the receive path as a secondary laser beam. Furthermore, a divergence angle associated with the secondary laser beam can be greater (e.g., by at least about 4 times) than a divergence angle associated with the transmit beam emitted along the transmit path. In this manner, the secondary laser beam can spread out with distance and therefore be less focused than the transmit beam. As such, the secondary laser beam can reflect off of objects within a near-field associated with the LIDAR system and can be focused onto the detector via one or more lenses disposed along the receive path. Furthermore, since the secondary laser beam is being reflected off of objects within the near-field and being focused onto the detector, detection of the objects within the near-field can be improved. In particular, a parallax error associated with detecting objects in the near-field can be reduced or eliminated.

Referring now to the FIGS., FIG. 1 depicts a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; perception data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based, at least in part, on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manual operating mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. A manual operating mode can be one in which a human driver present in the autonomous vehicle manually controls (e.g., acceleration, braking, steering) the vehicle 108 via one or more vehicle control devices (e.g., steering device) of the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing state data including information associated with one or more respective locations and/or characteristics of one or more objects over a plurality of time intervals and/or determining, based at least in part on the state data and a machine-learned prediction generator model, one or more predicted trajectories of the one or more objects at one or more subsequent time intervals following the plurality of time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of a location of the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data, including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain perception data 130 descriptive of a current and/or past state of an object that is proximate to the vehicle 108. The perception data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the perception data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction model. For example, the prediction system 126 can receive perception data 130 (e.g., from the perception system 124) associated with one or more objects within the surrounding environment of the vehicle 108. The prediction system 126 can input the perception data 130 (e.g., BEV image, LIDAR data, etc.) into the machine-learned prediction model to determine trajectories of the one or more objects based on the perception data 130 associated with each object. For example, the machine-learned prediction model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

As discussed above, the machine-learned prediction model can be previously trained via one or more machine-learning techniques. In some implementations, the machine-learned prediction model can be previously trained by one or more devices (e.g., training computing system, operations computing system 104, one or more remote computing devices 106, etc.) remote from the vehicle 108.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. In some implementations, the mobility controller can translate determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces.

In some implementations, the vehicle computing system 112 can perform one or more operations including activating, based at least in part on one or more signals or data (e.g., the sensor data 116, the map data 122, the perception data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
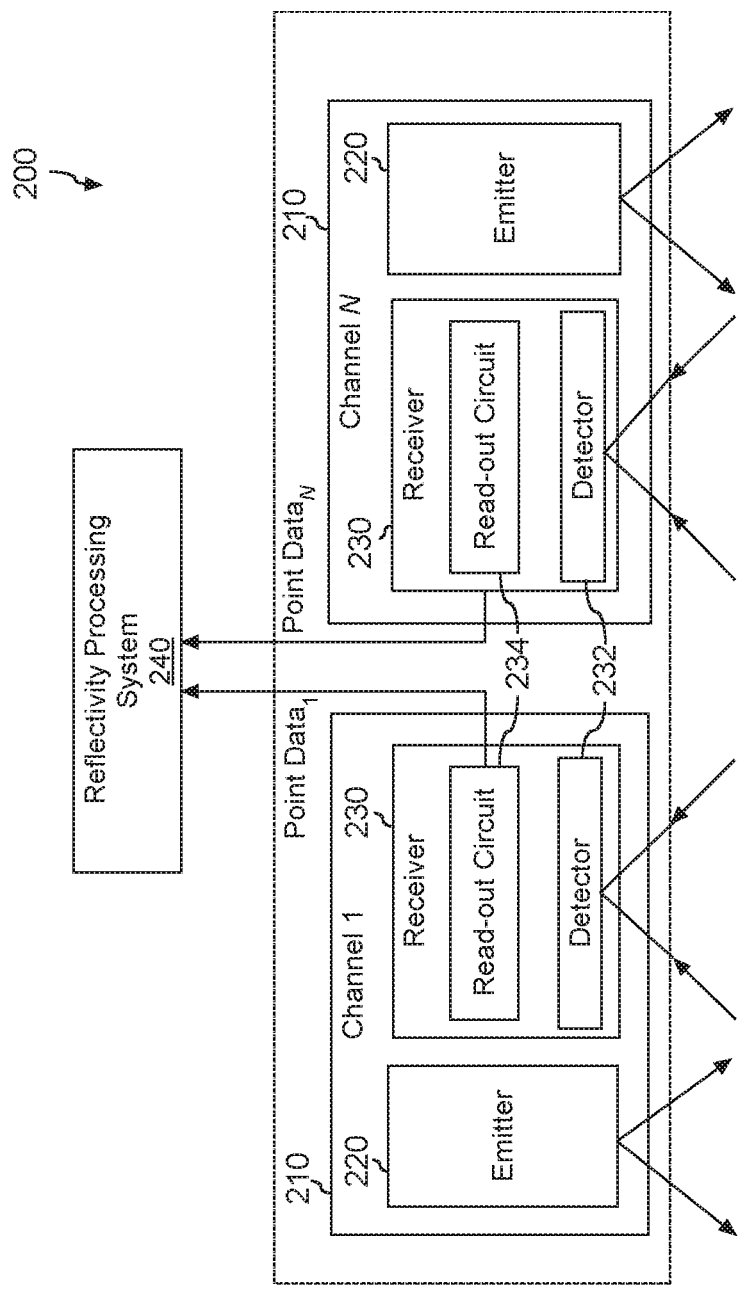
FIG. 2 depicts a block diagram of components of an autonomous vehicle according to example embodiments of the present disclosure.

Referring now to FIG. 2, a block diagram of a LIDAR system 200 is provided according to example embodiments of the present disclosure. It should be understood that the LIDAR system 200 can be included as part of the sensors 114 discussed above with reference to FIG. 1. As shown, the LIDAR system 200 can include multiple channels 210; specifically, channels 1-N are illustrated. The LIDAR system 200 can include one or more LIDAR units. Thus, the channels 1-N can be included in a single LIDAR unit or may be spread across multiple LIDAR units. Each channel 210 can output point data that provides a single point of ranging information. The point data output by each of the channels 210 (i.e., point data$_{1-N}$) can combined to create a point cloud that corresponds to a three-dimensional representation of the surrounding environment.

As shown, each channel 210 can include an emitter 220 paired with a receiver 230. The emitter 220 emits a laser signal into the environment that is reflected off the surrounding environment and returned back to a detector 232 (e.g., an optical detector) of the receiver 230. Each emitter 220 can have an adjustable power level that controls an intensity of the emitted laser signal. The adjustable power level allows the emitter 220 to be capable of emitting the laser signal at one of multiple different power levels (e.g., intensities).

The detector 232 can provide the return signal to a read-out circuit 234. The read-out circuit 234 can, in turn, output the point data based on the return signal. The point data can indicate a distance the LIDAR system 200 is from a detected object (e.g., road, pedestrian, vehicle, etc.) that is determined by the read-out circuit 234 by measuring time-of-flight (ToF), which is the time elapsed time between the emitter 220 emitting the laser signal and the receiver 230 detecting the return signal.

The point data further includes an intensity value corresponding to each return signal. The intensity value indicates a measure of intensity of the return signal determined by the read-out circuit 234. As noted above, the intensity of the return signal provides information about the surface reflecting the signal and can be used by the autonomy computing system 120 (FIG. 1) for localization, perception, prediction, and motion planning. The intensity of the return signals depends on a number of factors, such as the distance of the LIDAR system 200 to the detected object, the angle of incidence at which the emitter 220 emits the laser signal, temperature of the surrounding environment, the alignment of the emitter 220 and the receiver 230, and the reflectivity of the detected surface.

As shown, a reflectivity processing system 240 receives the point data from the LIDAR system 200 and processes the point data to classify specular reflectivity characteristics of objects. The reflectivity processing system 240 classifies the specular reflectivity characteristics of objects based on a comparison of reflectivity values derived from intensity values of return signals. In some embodiments, the LIDAR system 200 can be calibrated to produce the reflectivity values. For example, the read-out circuit 234 or another component of the LIDAR system 200 can be configured to normalize the intensity values to produce the reflectivity values. In these embodiments, the reflectivity values may be included in the point data received by the reflectivity processing system 240 from the LIDAR system 200. In other embodiments, the reflectivity processing system 240 may generate the reflectivity values based on intensity return values included in the point data received from the LIDAR system 200.

Regardless of which component is responsible for generating the reflectivity values, the process for doing so may, in some embodiments, include using a linear model to compute one or more calibration multipliers and one or more bias values to be applied to return intensity values. Depending on the embodiment, a calibration multiplier and bias value may be computed for and applied to each channel of the LIDAR system 200 at each power level. The linear model assumes a uniform diffuse reflectivity for all surfaces and describes an expected intensity value as a function of a raw intensity variable, a calibration multiplier variable, and/or a bias variable. The computing of the calibration multiplier and bias value for each channel/power level combination includes determining a median intensity value based on the raw intensity values output by the channel at the power level and using the median intensity value as the expected intensity value in the linear model while optimizing values for the calibration multiplier variable and bias variable. As an example, the calibration multiplier and bias value may be computed by solving the linear model using an Iterated Re-weighted Least Squares approach.

The calibration multiplier and bias value computed for each channel 210 at each power level can be assigned to the corresponding channel/power level combination. In this way, each power level of each channel of the LIDAR system 200 can have an independently assigned calibration multiplier and bias value from which reflectivity values may be derived. Once assigned, the calibration multiplier and bias value of each channel/power level combination can be used at run-time to determine reflectivity values from subsequent intensity values produced by the corresponding channel at the corresponding power level during operation of an autonomous or semi-autonomous vehicle. More specifically, reflectivity values can be determined from the linear model by using the value of the calibration multiplier and the bias value for the calibration multiplier variable and bias variable, respectively. In this manner, the intensity values can be normalized to be more aligned with the reflectivity of a surface by taking into account factors such as the distance of the LIDAR system 200 to the detected surface, the angle of incidence at which the emitter 220 emits the laser signal, temperature of the surrounding environment, and/or the alignment of the emitter 220 and the receiver 230.

Figure 3:
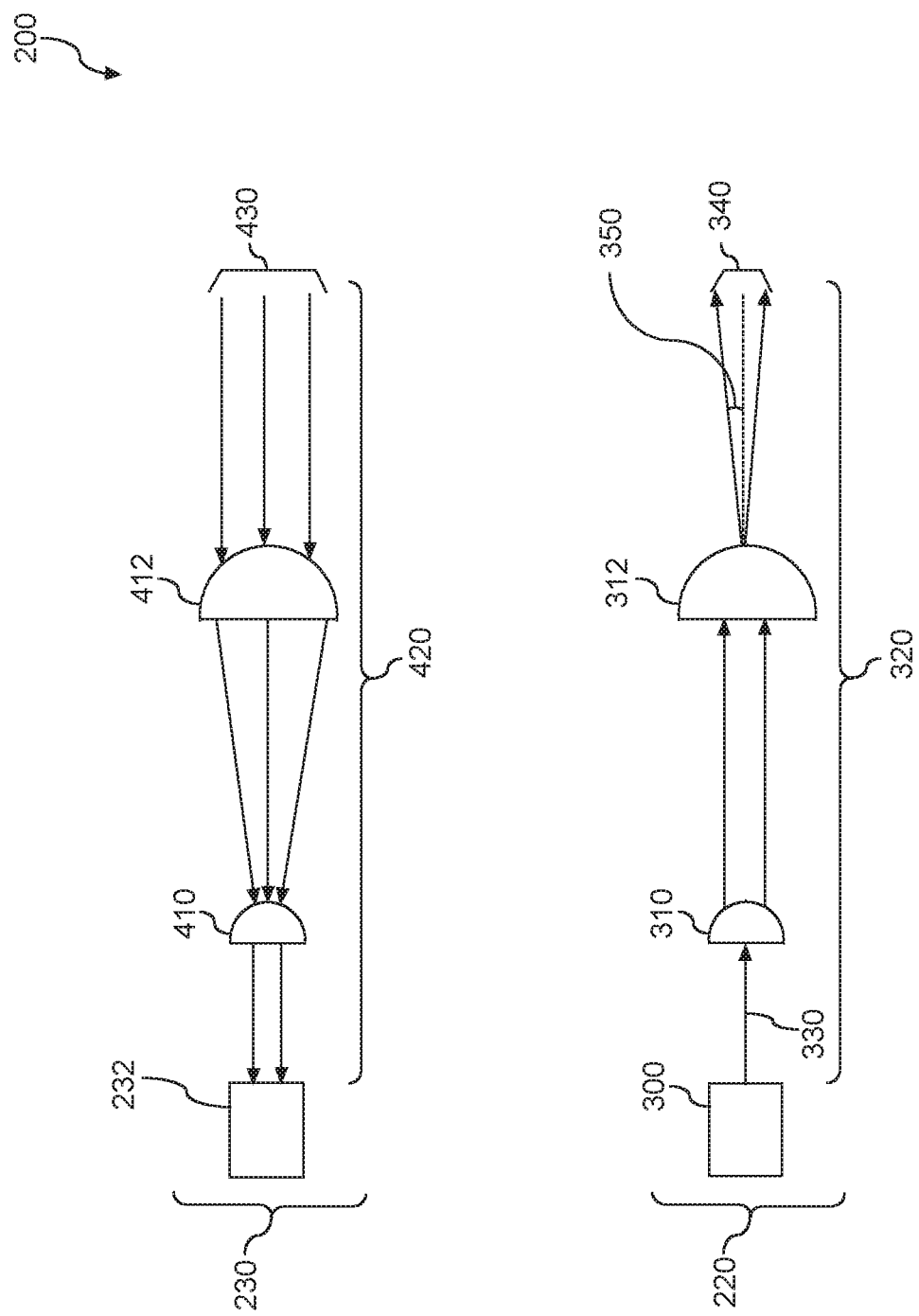
FIG. 3 depicts a schematic of a LIDAR system according to example embodiments of the present disclosure.

Referring now to FIG. 3, components of the emitter 220 of the LIDAR system 200 and the receiver 230 of the LIDAR system 200 are provided according to example embodiments of the present disclosure. In some implementations, the emitter 220 can include a light source 300, a first lens 310 and a second lens 312 disposed along a transmit path 320. As shown, the first lens 310 can be positioned between the light source 300 and the second lens 312 along the transmit path 320. Although the emitter 220 is depicted as having two lenses (e.g., first lens 310 and second lens 312) disposed along the transmit path 320, it should be understood that the emitter 220 can include more or fewer lenses disposed along the transmit path 320. For instance, in some implementations, the emitter 220 can include only one lens disposed along the transmit path 320. In alternative implementations, the emitter 220 can include more than two lenses disposed along the transmit path 320.

In some implementations, the light source 300 can include a laser diode. The light source 300 can be configured to emit a primary laser beam 330 through the first lens 310 and then the second lens 312 to provide a transmit beam 340. In some implementations, a divergence angle 350 associated with the transmit beam 340 can be about 0.5. degrees or less. It should be understood that the divergence angle 350 is indicative of an increase in beam diameter or radius of the transmit beam 340 with distance from the second lens 312. Stated another way, the divergence angle 350 of the transmit beam can be an angle subtended by the transmit beam 340 exiting the last lens (e.g., the second lens 312) in the transmit path 320.

In some implementations, the first lens 310 and the second lens 312 can each be a collimation lens. For instance, the first lens 310 can be a fast-axis collimation lens. Conversely, the second lens 312 can be a slow-axis collimation lens. In such implementations, the first lens 310 (e.g., fast axis collimation lens) can be configured to reduce a divergence angle associated with the primary laser beam 330. In particular, the first lens 310 can be configured to reduce the divergence angle such that the primary laser beam 330 is directed towards the second lens 312 (e.g., slow-axis collimation lens).

As shown, receiver 230 can be spaced apart from the emitter 220. In some implementations, the emitter 220 and the receiver 230 can be coupled to a vehicle body of the autonomous vehicle such that the emitter 220 and the receiver 230 are spaced apart from one another along a vertical direction of the autonomous vehicle 108 (FIG. 1) or a lateral direction of the autonomous vehicle 108. In particular, the emitter 220 and the receiver 230 can be positioned on the autonomous vehicle 108 such that the emitter 220 and the receiver 230 are parallel to one another.

In some implementations, the receiver 230 can include the detector 232, a first lens 410, and a second lens 412 disposed along a receive path 420. As shown, the first lens 410 of the receiver 230 can be positioned between the detector 232 and the second lens 412 of the receiver 230 along the receive path 420. Furthermore, although the receiver 230 is depicted as having two lenses (e.g., first lens 410 and second lens 412) disposed along the receive path 420, it should be understood that the receiver 230 can include more or fewer lenses disposed along the receive path 420. For instance, in some implementations, the receive 204 can include only one lens disposed along the receive path 420. In alternative implementations, the receiver 230 can include more than two lenses disposed along the receive path 420.

The lenses (e.g., first lens 410, second lens 412) of the receiver 230 can receive a reflected laser beam 430 corresponding to a reflection of the transmit beam 340. For instance, the reflected laser beam 430 can be the transmit beam 340 reflecting off one or more objects within a surrounding environment in which the LIDAR system 200 is operating. Furthermore, the lenses of the receiver 230 can be configured to direct the reflected laser beam 430 onto the detector 232. The detector 232 can be configured to process the reflected laser beam to generate a point cloud indicative of the surrounding environment in which the LIDAR system 200 is operating. The detector 232 can be, for instance, an avalanche photodiode (APD).

Figure 4:
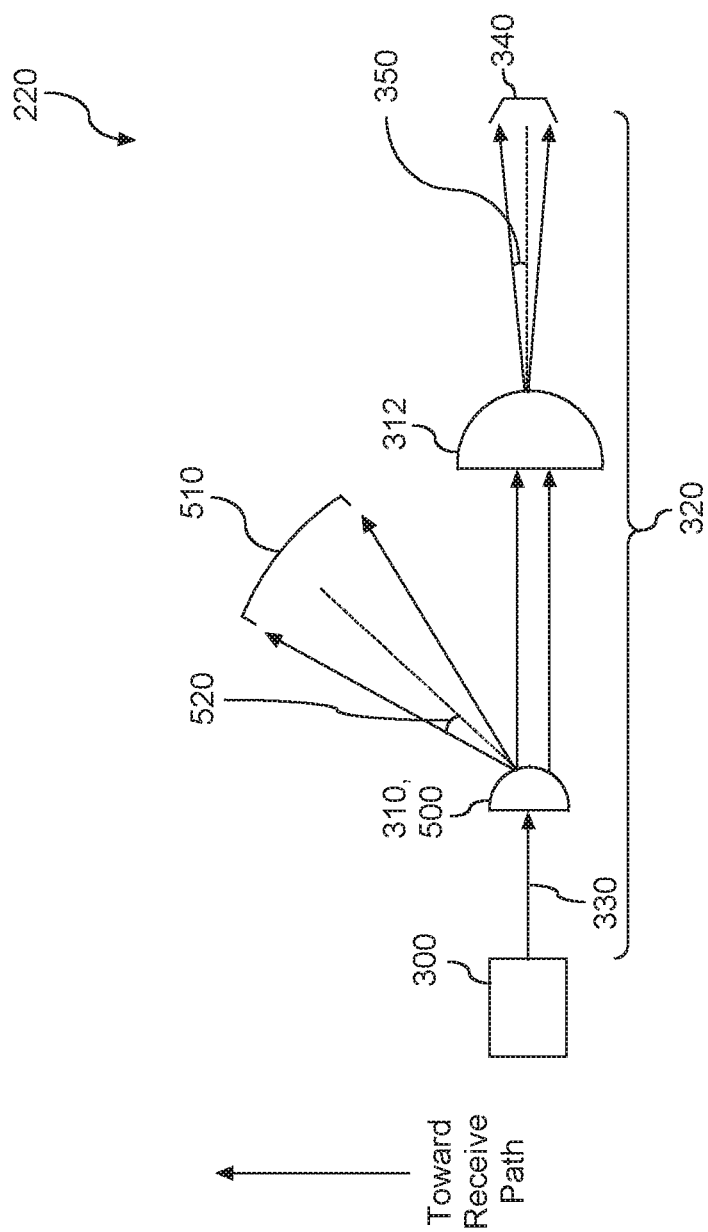
FIG. 4 depicts a schematic of an emitter of a LIDAR system according to example embodiments of the present disclosure.
Figure 5:
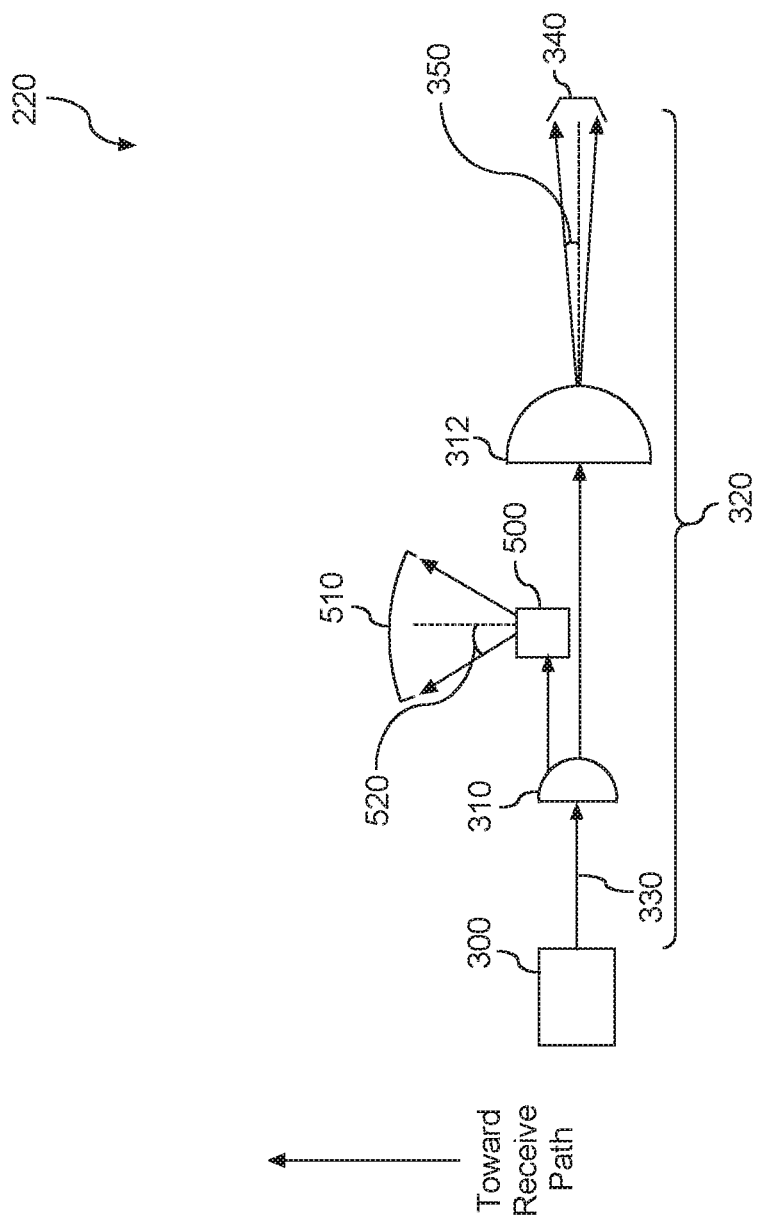
FIG. 5 depicts another schematic of an emitter of a LIDAR system according to example embodiments of the present disclosure.
Figure 6:
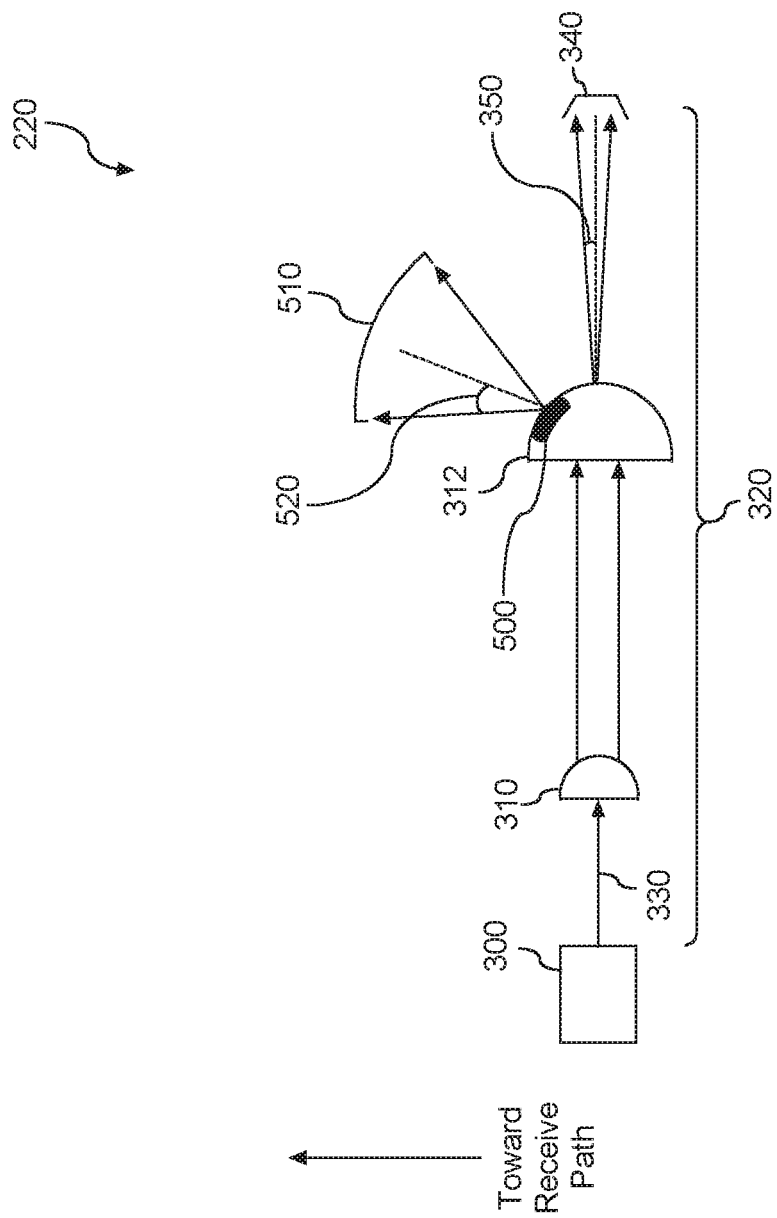
FIG. 6 depicts yet another schematic of an emitter of a LIDAR system according to example embodiments of the present disclosure.

Referring now to FIGS. 4-6, in some implementations, the LIDAR system 200 can include an optical element 500 disposed along the transmit path 320. The optical element 500 can be configured to divert a portion of the primary laser beam 330 towards the receive path 420 (e.g., shown in FIG. 3) as a secondary laser beam 510. An amount of energy associated with the secondary laser beam 510 can be less than an amount of energy associated with the primary laser beam 330. For instance, in some implementations, the amount of energy associated with the secondary laser beam 510 can be less than about 5 percent of a total amount of energy associated with the primary laser beam 330. Additionally, a divergence angle 520 associated with the secondary laser beam 510 can be different than the divergence angle 350 associated with the transmit beam 340. For instance, in some implementations, the divergence angle 520 of the secondary laser beam 510 can range from about 2 degrees to about 30 degrees. In this manner, the secondary laser beam 510 can spread out with distance and therefore be less focused than the transmit beam 340. It should be understood that the divergence angle 520 of the secondary laser beam 510 can be an angle subtended by the secondary laser beam 510 exiting the optical element 500.

In some implementations, the optical element 500 can form at least a portion of one of the lenses (e.g., first lens 310, second lens 312) disposed in the transmit path 320. For instance, in some implementations, the first lens 310 or the second lens 312 can be a bifocal lens. In such implementations, the optical element 500 can include a portion of the bifocal lens. In particular, the bifocal lens can be configured to direct a majority of the primary laser beam 330 along the transmit path 320 as the transmit beam 340. The bifocal lens can be further configured to direct a minority of the primary laser beam 330 towards the receive path 420 as the secondary laser beam 510.

In some implementations, the first lens 310 in the transmit path 320 can be a fast-axis collimation lens. In such implementations, the optical element 500 can form at least a portion of the fast-axis collimation lens. For instance, a portion of the fast-axis collimation lens can be configured to direct a portion of the primary laser beam 330 towards the receive path 420 as the secondary laser beam 510. Furthermore, the fast-axis collimation lens can be configured to spread the secondary laser beam 510 to reduce or eliminate a parallax error associated with detecting objects in a near-field (e.g., about 10 meters in front of the receiver 230) associated with the LIDAR system 200.

In some implementations, the second lens 312 in the transmit path 320 can be a slow-axis collimation lens. In such implementations, the optical element 500 can form at least a portion of the slow-axis collimation lens. In such implementations, the slow-axis collimation lens can be configured to direct a portion of the primary laser beam 330 towards the receive path 420 as the secondary laser beam 510. Furthermore, the slow-axis collimation lens can be configured to spread the secondary laser beam 510 to reduce or eliminate the parallax error associated with detecting objects in the near-field associated with the LIDAR system 200.

In some implementations, the optical element 500 can, as shown in FIG. 5, be separate from the first lens 310 and the second lens 312 of emitter 220. As shown, the optical element 500 can be disposed between the first lens 310 and the second lens 312 along the transmit path 320. For instance, the optical element 500 can include a divergence lens (e.g., wedge prism) that is positioned between the first lens 310 and the second lens 312. In such implementations, the optical element 500 (e.g., third lens) can be configured to direct a portion of the primary laser beam 330 towards the receive path 420 as the secondary laser beam 510. Furthermore, the optical element 500 can be configured to spread the secondary laser beam 510 to reduce or eliminate the parallax error associated with detecting objects in the near-field associated with the LIDAR system 200.

In some implementations, the optical element 500 can include a diffuser. The diffuser can spread the primary laser beam 330 such that a portion of the primary laser beam 330 is directed towards the receive path 420 as the secondary laser beam 510. In some implementations, the diffuser can form at least a portion of the lenses (e.g., first lens 310, second lens 312) disposed in the transmit path 320. For instance, the diffuser can form at least a portion of the second lens 312.

In such implementations, the diffuser can correspond to a portion of a surface of the second lens 312 that is modified relative to the remainder of the surface. For example, the portion of the surface of the second lens 312 can be roughened relative to the remainder of the surface. In this manner, light (e.g., primary laser beam 330) passing through the portion of the surface can spread and be directed towards the receive path 420 as the secondary laser beam 510. As another example, the diffuser can include a coating that is applied to at least a portion of the surface of the second lens 312. In this manner, light (e.g., primary laser beam 330) passing through the portion of the surface of the second lens 312 to which the coating has been applied can spread and be directed towards the receive path 420 as the secondary laser beam 510.

It should be understood that the portion of the surface of the second lens 312 that is modified relative to the remainder of the surface can correspond to any suitable surface of the second lens 312. For instance, in some implementations, the surface can be associated with an edge of the second lens 312. It should also be understood that, in some implementations, the diffuser can be separate (e.g., standalone) from the lenses (e.g., first lens 310, second lens 312) disposed in the transmit path 320.

Figure 7:
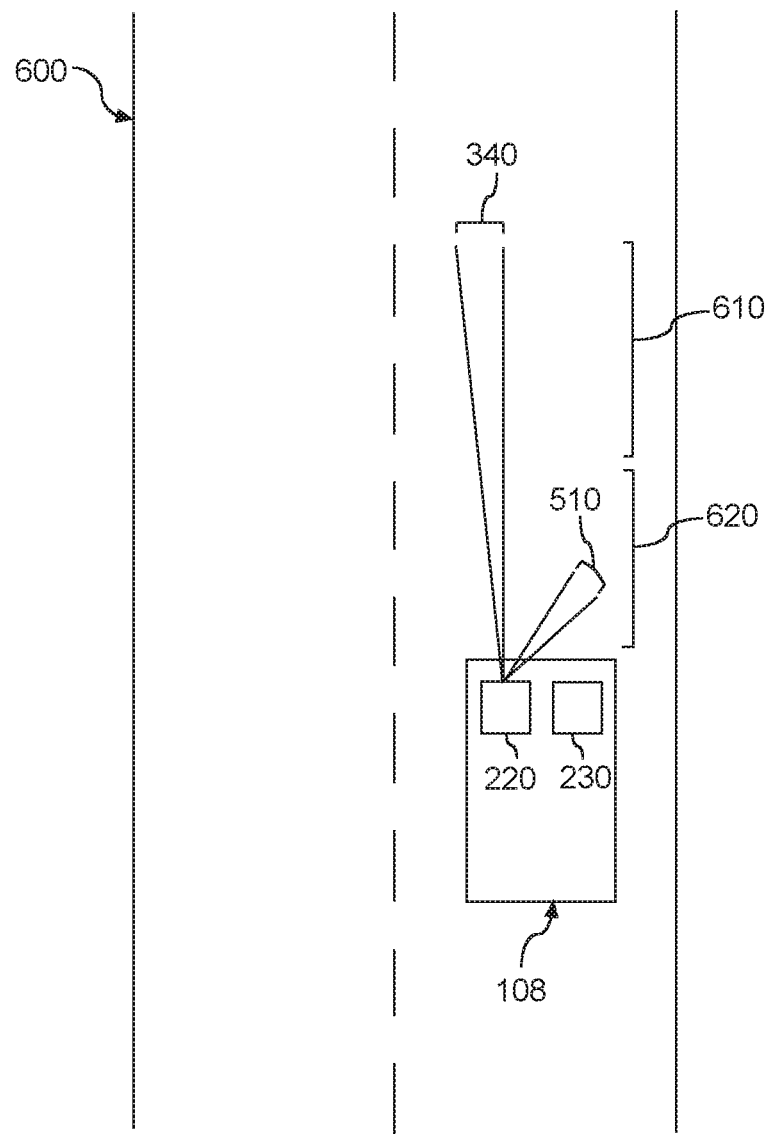
FIG. 7 depicts a LIDAR system onboard an autonomous vehicle according to example embodiments of the present disclosure.

Referring now to FIG. 7, the LIDAR system 200 can, in some implementations, be implemented onboard the autonomous vehicle 108 according to example embodiments of the present disclosure. As shown, the LIDAR system 200 can be operable while the autonomous vehicle 108 is traveling along a road 600. In particular, the emitter 220 can emit the transmit beam 340 to or towards a far-field 610 associated with the LIDAR system 200. Additionally, the emitter 220 can emit the secondary laser beam 510 to or towards a near-field associated with the LIDAR system 200. It should be understood that the near-field 620 can correspond to an area ranging from about 5 meters in front of the receiver 230 to about 10 meters in front of the receiver 230. It should also be understood that the far-field can correspond to any area that is beyond the near-field 620. For instance, in some implementations, the far-field 610 can correspond to any area that is greater than about 10 meters in front of the receiver 230.

The secondary laser beam 510 can spread within near-field 620. In this manner, the secondary laser beam 510 can reflect off of objects (e.g., pedestrians, vehicles, bicycles/bicyclists, etc.) within the near-field 620 and can be directed onto the receiver 230, specifically the detector 232 (shown in FIGS. 4-6) thereof. Furthermore, since the secondary laser beam 510 spreads within the near-field 620, light reflected off the objects with the near-field 620 and directed onto the detector 232 can be increased. This can lead to increased capability of the LIDAR system 200 to detect objects within the near-field 620 that may otherwise not be detected due to the parallax error.

Figure 8:
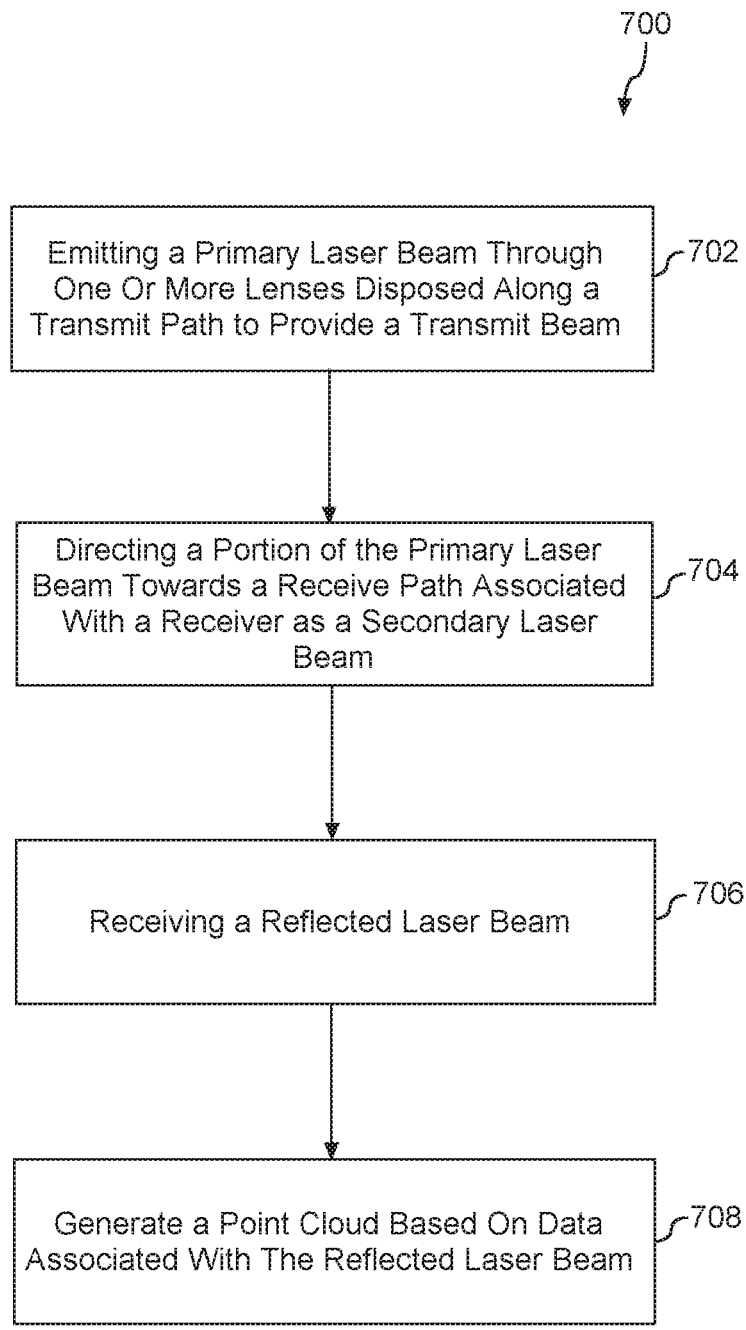
FIG. 8 depicts a flow diagram of a method of operating a LIDAR system according to example embodiments of the present disclosure.

Referring now to FIG. 8, a flowchart diagram of an example method 700 of controlling operation of a LIDAR system is provided according to example embodiments of the present disclosure. The method 700 can be implemented using the LIDAR system 200 discussed above with reference to FIGS. 3-6. Furthermore, FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include emitting, via an emitter of the LIDAR system, a primary laser beam through one or more lenses disposed along a transmit path to provide a transmit beam. In some implementations, the emitter of the LIDAR can include a light source configured to emit the primary laser beam. For instance, the light source can include a laser diode.

At (704), the method 700 can include directing, via an optical element disposed along the transmit path, a portion of the primary laser beam towards a receive path as the secondary laser beam. In some implementations, the optical element can form at least a portion of the one or more lenses disposed in the transmit path. For instance, in some implementations, the one or more lenses disposed in the transmit path can include a bifocal lens. In such implementations, the optical element can include a portion of the bifocal lens that is configured to divert the primary laser beam towards a receive path as a secondary laser beam. In some implementations, the optical element can include a diffuser that forms at least a portion of a surface of the one or more lenses disposed on the transmit path. In alternative implementations, the optical element can be separate from the one or more lenses disposed in the transmit path. For instance, in some implementations, the optical element can include a diffuser that is separate (e.g., standalone) from the one or more lenses. Alternatively, the optical element can include a divergence lens (e.g., wedge prism) that is separate from the one or more lenses disposed in the transmit path. For instance, the divergence lens can be positioned between a first lens (e.g., fast-axis collimation lens) and a second lens (e.g., slow-axis collimation lens) disposed in the transmit path.

At (706), the method 700 can include receiving, via one or more lenses of the receiver, a reflected laser beam. The reflected laser beam can include a reflected secondary laser beam. Alternatively, the reflected laser beam can include a reflected transmit beam. At (708), the method 700 can include generating, via a detector of the receiver, a point cloud based, at least in part, on data associated with the reflected laser beam.

Figure 9:
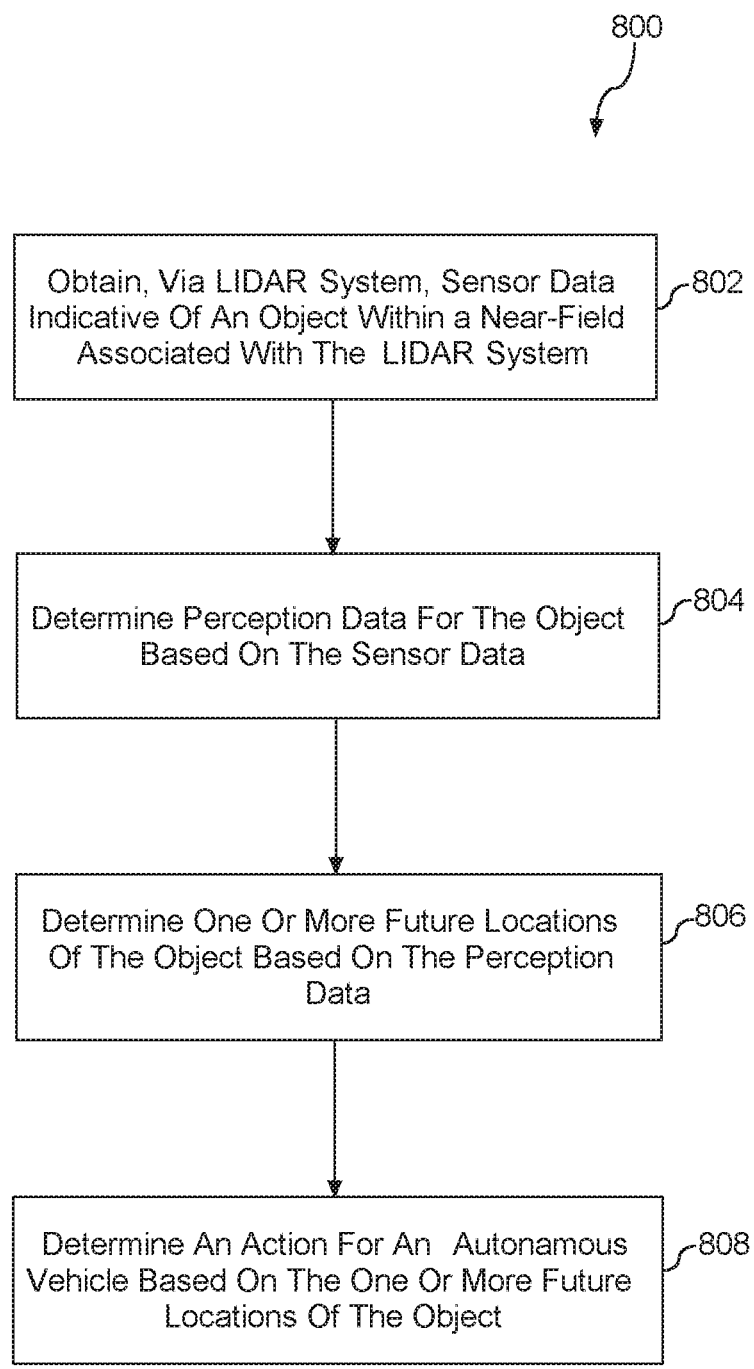
FIG. 9 depicts a flow diagram of a method of controlling operation of an autonomous vehicle according to sensor data obtained from a LIDAR system according to example embodiments of the present disclosure.

Referring now to FIG. 9, a flowchart diagram of an example method 800 of controlling operation of an autonomous vehicle having a LIAR system is provided according to example embodiments of the present disclosure. One or more portion(s) of the method 800 can be implemented by a computing system that includes one or more computing devices such as, for example, the computing systems described with reference to the other figures (e.g., the vehicle computing system 112, the operations computing system 104, the one or more remote computing devices 106, etc.). Each respective portion of the method 800 can be performed by any (or any combination) of one or more computing devices. Moreover, one or more portion(s) of the method 800 can be implemented as an algorithm on the hardware components of the device(s) described herein to, for example, control operation of the autonomous vehicle according to data obtained from the LIDAR system. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 800 can be performed additionally, or alternatively, by other systems.

At (802), the method 800 can include obtaining, via the LIDAR system, sensor data indicative of an object within a near-field associated with the LIDAR system.

At (804), the method 800 can include determining perception data for the object within the near-field based, at least in part, on the sensor data obtained at (802). The perception data can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class); and/or other state information.

At (806), the method 800 can include determining one or more future locations of the object based, at least in part, on the perception data for the object within the near-field associated with the LIDAR system. For example, the autonomous vehicle can generate a trajectory (e.g., including one or more waypoints) that is indicative of a predicted future motion of the object, given the object's heading, velocity, type, etc. over current/previous timestep(s).

At (808), the method 800 can include determining an action for the autonomous vehicle based at least in part on the one or more future locations of the object within the near-field associated with the LIDAR system. For example, the autonomous vehicle can generate a motion plan that includes a vehicle trajectory by which the vehicle can travel to avoid interfering/colliding with the object. In another example, the autonomous vehicle can determine that the object is a user that intends to enter the autonomous vehicle (e.g., for a human transportation service) and/or that intends place an item in the autonomous vehicle (e.g., for a courier/delivery service). The autonomous vehicle can unlock a door, trunk, etc. to allow the user to enter and/or place an item within the vehicle. The autonomous vehicle can communicate one or more control signals (e.g., to a motion control system, door control system, etc.) to initiate the determined actions.

Figure 10:
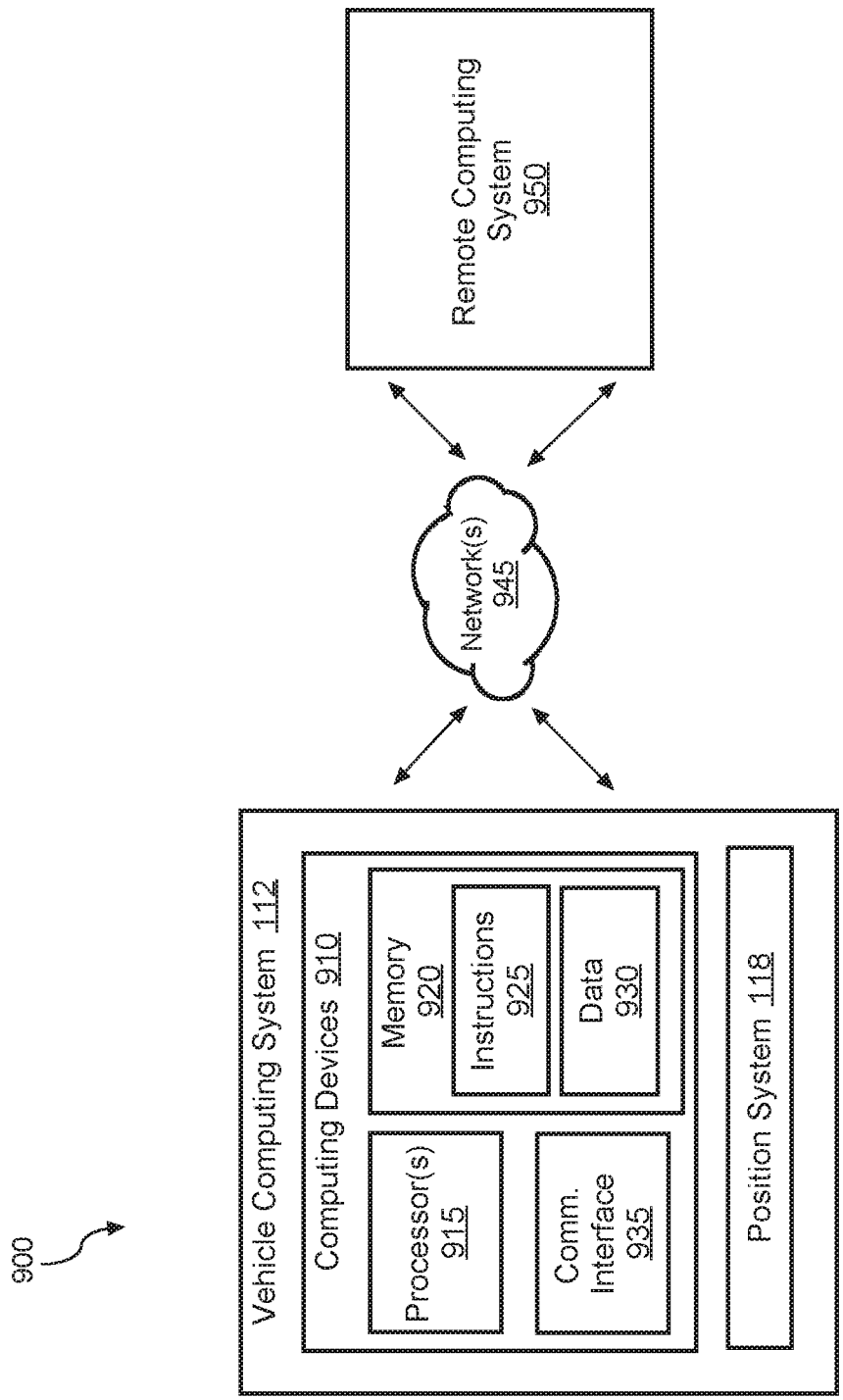
FIG. 10 depicts an example computing system according to example embodiments of the present disclosure.

FIG. 10 depicts example system components of an example computing system 900 according to example embodiments of the present disclosure. The example computing system 900 can include the vehicle computing system 112 and one or more remote computing system(s) 950 that are communicatively coupled to the vehicle computing system 112 over one or more network(s) 945. The computing system 900 can include one or more computing device(s) 910. The computing device(s) 910 of the vehicle computing system 112 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, etc., and combinations thereof.

The memory 920 can store information that can be accessed by the one or more processors 915. For instance, the memory 920 (e.g., one or more non-transitory computer-readable storage mediums, memory devices) can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 to perform operations such as any of the operations and functions for which the computing systems) are configured, as described herein.

The memory 920 can store data 930 that can be obtained, received, accessed, written, manipulated, created, and/or stored. The data 930 can include, for instance, sensor data obtained via the LIDAR system 200 (shown in FIG. 2), and/or other data/information described herein. In some implementations, the computing device(s) 910 can obtain from and/or store data in one or more memory device(s) that are remote from the computing system 905 such as one or more memory devices of the remote computing system 950.

The computing device(s) 910 can also include a communication interface 935 used to communicate with one or more other system(s) (e.g., remote computing system 950). The communication interface 935 can include any circuits, components, software, etc. for communicating via one or more networks (e.g., 945). In some implementations, the communication interface 935 can include for example, one or more of a communications controller, receiver, transceiver, transmitter, port, conductors, software and/or hardware for communicating data/information.

The network(s) 945 can be any type of network or combination of networks that allows for communication between devices. In some embodiments, the network(s) 945 can include one or more of a local area network, wide area network, the Internet, secure network, cellular network, mesh network, peer-to-peer communication link and/or some combination thereof and can include any number of wired or wireless links. Communication over the network(s) 945 can be accomplished, for instance, via a network interface using any type of protocol, protection scheme, encoding, format, packaging, etc.

FIG. 10 illustrates one example system 900 that can be used to implement the present disclosure. Other computing systems can be used as well without deviating from the scope of the present disclosure. The use of computer-based systems allows for a great variety of possible configurations, combinations, and divisions of tasks and functionality

What is claimed is:

1. A light detection and ranging (LIDAR) system for an autonomous vehicle, the LIDAR system comprising:
an emitter comprising a light source and a first lens that is coupled to a second lens positioned along a transmit path, the light source configured to emit a primary laser beam through the first lens then the second lens in the transmit path to provide a transmit beam towards a far-field associated with the LIDAR system;
a receiver spaced apart from the emitter, the receiver comprising one or more lenses positioned along a receive path such that the one or more lenses of the receiver receive a reflected laser beam; and
an optical element positioned along the transmit path, the optical element configured to direct a portion of the primary laser beam in a direction towards the receive path as a secondary laser beam that is emitted towards a near-field associated with the LIDAR system;
wherein the first lens in the transmit path comprises a fast-axis collimation lens, the second lens in the transmit path comprises a slow-axis collimation lens, and the optical element forms at least a portion of the fast-axis collimation lens or the slow-axis collimation lens; and
wherein the primary laser beam is emitted towards the far-field at a first angular range relative to the autonomous vehicle simultaneously with the secondary laser beam being emitted towards the near-field at a second angular range relative to the autonomous vehicle, wherein the first angular range is smaller than the second angular range.

2. The LIDAR system of claim 1, wherein an energy associated with the secondary laser beam comprises about 5 percent or less of a total energy of the primary laser beam.

3. The LIDAR system of claim 1, wherein a divergence angle associated with the secondary laser beam is in a range from about 2 degrees to about 30 degrees.

4. The LIDAR system of claim 1, wherein a divergence angle associated with the transmit beam is less than about 0.5 degrees.

5. The LIDAR system of claim 1, wherein the optical element forms at least a portion of the first lens or the second lens in the transmit path.

6. The LIDAR system of claim 5, wherein:
the optical element forms at least a portion of the fast-axis collimation lens.

7. The LIDAR system of claim 5, wherein the first lens or the second lens in the transmit path comprise a bifocal lens.

8. The LIDAR system of claim 1, wherein:
the optical element forms at least a portion of the slow-axis collimation lens.

9. The LIDAR system of claim 1, wherein the optical element comprises a diffuser that forms at least a portion of the first lens or the second lens in the transmit path.

10. The LIDAR system of claim 9, wherein the diffuser is disposed on a surface of the first lens or the second lens.

11. The LIDAR system of claim 1, wherein the optical element comprises a divergence lens positioned sequentially in the transmit path between the first lens and the second lens.

12. The LIDAR system of claim 1, wherein the far-field associated with the LIDAR system corresponds to an area that is greater than about 10 meters in front of the receiver, and wherein the near-field associated with the LIDAR system corresponds to an area ranging from about 5 meters in front of the receiver to about 10 meters in front of the receiver.

13. An autonomous vehicle comprising:
a light detection and ranging (LIDAR) system coupled to a vehicle body of the autonomous vehicle, the LIDAR system comprising:
an emitter comprising a light source and a first lens that is coupled to a second lens positioned along a transmit path, the light source configured to emit a primary laser beam through the first lens then the second lens in the transmit path to provide a transmit beam towards a far-field associated with the LIDAR system;
a receiver spaced apart from the emitter, the receiver comprising one or more lenses positioned along a receive path such that the one or more lenses of the receiver receive a reflected laser beam; and
an optical element positioned along the transmit path, the optical element configured to direct a portion of the primary laser beam in a direction towards the receive path as a secondary laser beam that is emitted towards a near-field associated with the LIDAR system;
wherein the first lens in the transmit path comprises a fast-axis collimation lens, the second lens in the transmit path comprises a slow-axis collimation lens, and the optical element forms at least a portion of the fast-axis collimation lens or the slow-axis collimation lens; and
wherein the primary laser beam is emitted towards the far-field at a first angular range relative to the autonomous vehicle simultaneously with the secondary laser beam being emitted towards the near-field at a second angular range relative to the autonomous vehicle, wherein the first angular range is smaller than the second angular range.

14. The autonomous vehicle of claim 13, wherein a divergence angle associated with the secondary laser beam is in a range from about 2 degrees to about 30 degrees.

15. The autonomous vehicle of claim 14, wherein a divergence angle associated with the primary laser beam is less than about 0.5 degrees.

16. The autonomous vehicle of claim 13, wherein the optical element forums at least a portion of the first lens or the second lens of the emitter.

17. The autonomous vehicle of claim 13, wherein the optical element comprises a diffuser that forms at least a portion of the first lens or the second lens in the transmit path.

18. The autonomous vehicle of claim 13, further comprising:
one or more processors; and
one or more tangible, non-transitory, computer readable media that store instructions for execution by the one or more processors to cause the one or more processors to perform operations, the operations comprising:
obtaining sensor data via the LIDAR system, the sensor data being indicative of an object within a near-field associated with the LIDAR system;
determining perception data for the object within the near-field associated with the LIDAR system based at least in part on the sensor data;

determining one or more future locations of the object based at least in part on the perception data for the object within the near-field associated with the LIDAR system; and determining an action for the autonomous vehicle based at least in part on the one or more future locations of the object within the near-field associated with the LIDAR system.

19. A method of operating a light detection and ranging (LIDAR) system for an autonomous vehicle, the LIDAR system comprising an emitter and a receiver spaced apart from the emitter, the method comprising:

emitting, via the emitter, a primary laser beam through a first lens then a second lens disposed along a transmit path to provide a transmit beam towards a far-field associated with the LIDAR system;

directing, via an optical element disposed along the transmit path, a portion of the primary laser beam as a secondary laser beam towards a receive path associated with the receiver of the LIDAR system and to a near-field associated with the LIDAR system, wherein the primary laser beam is emitted towards the far-field at a first angular range relative to the autonomous vehicle simultaneously with the secondary laser beam being emitted towards the near-field at a second angular range relative to the autonomous vehicle, wherein the first angular range is smaller than the second angular range;

wherein the first lens in the transmit path comprises a fast-axis collimation lens, the second lens in the transmit path comprises a slow-axis collimation lens, and the optical element forms at least a portion of the fast-axis collimation lens or the slow-axis collimation lens; and receiving, via one or more lenses of the receiver, a reflected laser beam; and generating, via a detector of the receiver, a point cloud based, at least in part, on data associated with the reflected laser beam.

20. The method of claim 19, wherein an energy associated with the secondary laser beam comprises about 5 percent or less of a total energy of the primary laser beam.

* * * * *